3,467,753
Patented Sept. 16, 1969

3,467,753
SUBSTITUTED PYRIDYLAMIDE AND PYRIDYL-
UREA NON-PHYTOTOXIC FUNGICIDES
Harold M. Foster, Park Forest, Ill., and John R. Kil-
sheimer, Westfield, N.J., assignors to Mobil Oil Corpo-
ration, a corporation of New York
No Drawing. Original application Mar. 29, 1965, Ser. No.
443,704, now Patent No. 3,376,309, dated Apr. 2, 1968.
Divided and this application Aug. 10, 1966, Ser. No.
571,414
Int. Cl. A01n 9/22, 7/04
U.S. Cl. 424—263                                14 Claims

ABSTRACT OF THE DISCLOSURE

Pyridyl amines having at least one substituent attached to the pyridine ring in a position non-adjacent to the amide group are effective as systemic fungicides. They can be applied to a fungus, to a plant or to the soil in which a plant is to grow.

---

This application is a division of copending application Ser. No. 443,704, which was filed on Mar. 29, 1965, and which is now U.S. Patent No. 3,376,309.

The present invention relates to a novel class of pyridyl amides, and to their use as fungicides, particularly as systemic fungicides. More specifically, the invention relates to pyridyl amides having at least one substituent attached to the pyridine ring in a position non-adjacent to the amide group and which have the following generic structural formula:

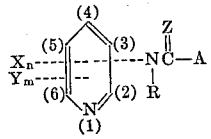

wherein —A is selected from the group consisting of —NR$_2$ and non-aromatic branched-chain hydrocarbon radicals; each R is the same or different from each other R and is selected from the group consisting of hydrogen and non-aromatic hydrocarbon radicals; Z is selected from the group consisting of oxygen and sulfur; X is selected from the group consisting of halogen and alkoxy (—OCH$_3$ to —OC$_8$H$_{17}$); Y is selected from the group consisting of hydroxy, halogen, nitro, alkyl (C$_1$C$_4$), alkenyl (C$_2$–C$_4$), alkoxy (—OCH$_3$ to —OC$_8$H$_{17}$), amino, alkylamino, dialkylamino, amide, mercapto, alkylmercapto, cyano (—CN), thiocyano (—SCN) and isothiocyano (—NCS); in which $n$ is one, two or three; in which $m$ is zero, one or two; and in which each Y, when $m$ is other than zero, and each X is attached to a carbon atom in the pyridine ring which is non-adjacent the position at which the —NRCZA group is attached to the ring.

In the structural formula shown above, the numerals are employed to illustrate the ring position-numbering system which is used herein for purposes of describing the novel compounds of this invention and their preparation. Also with reference to the description herein of the novel compounds of this invention, "non-aromatic hydrocarbon radicals" should be understood to include aliphatic groups, alicyclic groups and structural combinations thereof. Examples of such "non-aromatic hydrocarbon radicals," which preferably contain from one to six carbon atoms, include methyl, ethyl, propyl, butyl, pentyl, hexyl and other alkyl groups; ethenyl, propenyl, butenyl, pentenyl, hexenyl and other alkenyl groups; cyclopropyl, cyclobutyl, cyclopentyl, cyclohexyl and other cycloalkyl groups; cyclopropenyl, cyclobutenyl, cyclopentenyl, cyclohexenyl and other cycloalkenyl groups; and cyclopropadienyl, cyclobutadienyl, cyclopentadienyl, cyclohexadienyl and other cyclodienyl groups. Also as used herein, the term "non-aromatic branched-chain hydrocarbon radicals" should be understood to include any of such "non-aromatic hydrocarbon radicals" which are characterized by branched-chaining, i.e., aliphatic groups containing at least one branch chain, alicyclic groups (which are considered herein as comprising several branch-chains emanating from a single carbon atom in the cyclic structure and directly attached to each other elsewhere in the cyclic structure) and structural combinations thereof. Examples of such "non-aromatic branched-chain hydrocarbon radicals" include isopropyl, isobutyl, tert-butyl, isopentyl, tert-pentyl, isohexyl, tert-hexyl, and other branched-chain alkyl groups; isopropenyl, isobutenyl, isopentenyl, tert-pententyl, isohexenyl, tert-hexenyl and other branched-chain alkenyl groups; cyclopropyl, cyclobutyl, cyclopentyl, cyclohexyl and other cycloalkyl groups; cyclopropenyl, cyclobutenyl, cyclopentenyl, cyclohexenyl and other cycloalkenyl groups; cyclopropadienyl, cyclobutadienyl, cyclopentadienyl, cyclohexadienyl and other cyclodienyl groups; cyclopropyl-methyl, cyclobutyl-methyl, cyclopentyl-methyl, 1- or 2-cyclopropyl-ethyl, 1- or 2-cyclobutyl ethyl, 1-, 2- or 3-cyclopropyl-propyl and other non-aromatic hydrocarbon radicals containing one or more alicyclic groups attached to an aliphatic group which is directly linked to the —NRCZ group of the novel compound; 1- or 2-methyl-cyclopropyl, 1-, 2- or 3-methyl-cyclobutyl, 1-, 2- or 3-methyl-cyclopentyl and other methyl-cycloalkyl groups; 1,2- or 2,3-dimethyl-cyclopropyl, 1,2, 1,3-, or 2,3-dimethyl-cyclobutyl and other dimethyl-cycloalkyl groups; 1,2,3-trimethyl-cyclopropyl and other trimethyl-cycloalkyl groups; 1- or 2-ethyl-cyclopropyl, 1-, 2- or 3-ethyl-cyclobutyl and other ethyl-cycloalkyl groups; 1- or 2-propyl-cyclopropyl, 1- or 2-isopropyl-cyclopropyl and other propyl- or isopropyl-cycloalkyl groups; as well as other non-aromatic hydrocarbon radicals containing one or more alkyl and/or alkenyl groups attached to an alicyclic group which is directly linked to the —NRCZ group of the novel compound.

Synthesis of the novel compounds represented by the foregoing generic structural formula can be accomplished by various methods, utilizing numerous intermediates which can be prepared by convenient methods known to the art. A convenient method generally applicable for synthesis of the novel pyridyl ureas of this invention, i.e., those compounds represented by the foregoing generic formula when A is NR$_2$, includes the reaction of an isocyanate, e.g. an alkyl isocyanate such as methyl isocyanate, with a pyridine having an appropriately reactive nitrogen-containing ring substituent, e.g. an amino group, and either a halogen or an alkoxy group attached to the pyridine ring at a position non-adjacent to the reactive nitrogen-containing substituent. Other of the novel pyridyl ureas, e.g. the 1,1-dialkyl-, 1-alkenyl-, 1-cycloalkyl-3- and 1-cycloalkenyl-3-pyridyl ureas of the described class, can be derived in the manner just described by using in place of the alkyl isocyanate an appropriate dialkyl compound (e.g. dimethylcarbamyl chloride), alkenyl compound (e.g. allyl isocyanate) or alicyclic compound (e.g. cyclopropyl isocyanate). The novel pyridyl thioureas of this invention, i.e., those having a —NRCSNR$_2$ group linked to the pyridine ring, can be prepared in a similar manner by using an appropriate isothiocyanate in place of the alkyl isocyanate.

In general, when reacting an isocyanate with an aminopyridine to form one of the novel pyridyl ureas of this invention it is preferable to use a small excess, e.g. up to 10 percent or higher, of the isocyanate reactant in order to insure that the reaction is substantially complete.

Preferably, such a synthesis reaction is carried out in a suitable organic liquid reaction medium, e.g. an aromatic, aliphatic or other organic compound such as benzene, toluene, acetone, cyclohexane, etc. It is also advantageous to carry out the reaction in the presence of a catalytic amount of a compound capable of catalyzing the reaction, e.g. a tin compound such as dibutyl tin diacetate or a tertiary amine such as triethylamine or pyridine, but the reaction will proceed without a catalyst, although not as rapidly.

For synthesis of the novel pyridyl amides in which A in the foregoing generic formula is a non-aromatic branched-chain hydrocarbon radical, a generally applicable convenient method includes the reaction of an anhydride of a non-aromatic branched-chain carboxylic acid, preferably having from four to seven carbon atoms per acid group, e.g. isobutyric anhydride, tert-valeric anhydride, etc., with a pyridine having an appropriately reactive nitrogen-containing ring substituent, e.g. an amino group, and either a halogen or an alkoxy group attached to the pyridine ring at a position non-adjacent to the reactive nitrogen-containing substituent. The novel thioamides of this invention, i.e. those having a —NRCSA group (in which A is a non-aromatic branched-chain hydrocarbon radical) linked to the pyridine ring, can be prepared in a similar manner by using an appropriate anhydride of a non-aromatic branched-chain thiocarboxylic acid, e.g., thioisobutyric acid, in place of the anhydride of a non-aromatic carboxylic acid. In general, when reacting an anhydride of a non-aromatic acid with an aminopyridine to form one of the novel pyridyl amides of this invention, it is preferable to use a molar excess, e.g. up to 50 percent or higher, of the anhydride reactant to insure substantial completion of the reaction.

Reaction temperature is not critical in the preparation of the novel compounds of this invention; temperatures from somewhat below room temperature up to 100° C. or somewhat higher can be used. However, a reaction temperature between 25° C. and 90° C. is generally most advantageous, and synthesis of the novel pyridyl amides by the aforedescribed method utilizing a non-aromatic acid anhydride is generally more satisfactorily carried out at temperatures in the higher portion of that range. The reaction can be conducted below or above atmospheric pressure, but a pressure of about one atmosphere or slightly higher is usually satisfactory.

Following synthesis by any of the aforedescribed generally applicable methods, the normally solid novel pyridyl amides can be separated from the reaction mixture by any suitable method, e.g. by removing the major part of the liquid portion of the reaction mixture by vacuum distillation, slurrying or triturating the residue with an appropirate organic liquid such as an aromatic compound (e.g. benzene) or an aliphatic compound (e.g. heptane), washing and drying. Thereafter, the normally solid product can be further purified by an appropriate technique, such as recrystallization from an organic liquid solvent, e.g. methanol, acetone, hexane, etc.

In another method of preparing the novel pyridyl amides of this invention, a pyridine having a halogen or alkoxy substituent and an appropriately reactive nitrogen-containing substituent, e.g. an amino group, is reacted with phosgene in the presence of a tertiary amine (HCl scavenger), e.g. N,N-dimethylaniline, providing a carbamyl chloride intermediate which is then converted to the desired novel pyridyl urea by reaction with the appropriate amine, e.g. methylamine, dimethylamine, allylamine, cyclohexylamine, etc. The novel pyridyl thioureas of this invention, i.e., those having a —NRCSNR$_2$ group linked to the pyridine ring, can be prepared in a similar manner by using thiophosgene to provide a thiocarbamyl chloride intermediate and then reacting the thiocarbamyl chloride with an amine.

In order to obtain one of the novel pyridyl amides having the —NRCZA group and one, two or three particular halogen and/or alkoxy substituents linked to particular non-adjacent positions, it is only necessary to use an intermediate having such halogen and/or alkoxy substituents in the desired position, and an appropriately reactive nitrogen-containing substituent, e.g. an amino group, in the ring position in which the —NRCZA group of the novel compound is desired. For example, 2-chloro-4-aminopyridine, 2-amino-4-bromopyridine, 2-amino-6-methoxypyridine, and 2-methoxy-3-iodo-5-aminopyridine can be used to prepare correspondingly substituted novel pyridyl amides, e.g. 1,1-dimethyl-3-(2-chloro-4-pyridyl) urea or N-(2-chloro-4-pyridyl)isobutyramide, 1-ethyl-3-methyl-3-(4-bromo-2-pyridyl) urea or N-(4-bromo-2-pyridyl)isopentanamide, 1-cyclopropyl - 3-(6-methoxy-2-pyridyl)urea or N-(6-methoxy-2-pyridyl)tertbutyramide, 1-allyl-3-(2-methoxy-3-iodo-5-pyridyl)urea or N-(2-methoxy-3-iodo-5-pyridyl)isopentanamide, respectively.

The novel class of compounds of this invention also includes pyridyl amides having one or two ring substituents in addition to one or two of the halogen and/or alkoxy groups represented by X in the generic formula illustrated hereinbefore and attached to the pyridine ring in positions non-adjacent to the amide group. Such additional substituents, which are designated as Y in the generic formula, can be a halogen, hydroxy, nitro, alkyl ($C_1$–$C_4$), alkenyl ($C_2$–$C_4$), alkoxy (—$OCH_3$ to —$OC_8H_{17}$), amino, alkylamino, dialkylamino, amide, mercapto, alkylmercapto, cyano (—CN), thiocyano (—SCN) or isothiocyano (—NCS). When any of such additional substituents are present on the ring of the novel pyridyl amides, they are likewise in positions which are non-adjacent to the ring position to which the —NRCZA group is attached.

Any of the foregoing novel pyridyl amides having one or two of the ring substituents designated in the generic formula as Y can be prepared in a manner similar to that described hereinbefore by using, as the intermediate in the synthesis reaction, a pyridine having the desired substituents represented in the formula as Y in addition to one or two halogen and/or alkoxy substituents and a non-adjacent appropriately reactive nitrogen-containing ring substituent. For example, 2-amino-4-methyl-5-chloropyridine can be used to prepare 1-methyl-3-(5-chloro-4-methyl-2-pyridyl)urea or N-(5-chloro-4-methyl-2-pyridyl) isobutyramide, 5-amino-3-nitro-2-methoxypyridine can be used to prepare 1,1-dimethyl-3-(2-methoxy-3-nitro-5-pyridyl)urea or N-(2-methoxy - 3 - nitro-5-pyridyl)tertbutyramide, etc.

The following examples illustrate the preparation of compounds of the novel class to which this invention relates. It will be appreciated that this invention is not limited to the specific compounds prepared in the examples, which are merely representative of the novel class of compounds described hereinbefore, as those skilled in the art will readily appreciate.

EXAMPLE I 12.9 grams (0.1 mole) of 2-amino-5-chloropyridine and 9 grams (0.15 mole) of methyl isocyanate were reacted at room temperature in 50 milliliters of toluene containing three drops of dibutyltin diacetate. After several days, the toluene was removed by vacuum distillation and the residue was slurried with boiling benzene. The solid product was collected from the slurry, washed with benzene and dried. The solid product, weighing 15.7 grams (84% of theoretical yield), had a melting point of 195–197° C. After further purification by recrystallization from methanol, a sample of the product had a melting point of 198–200° C. and contained 45.3% carbon, 4.4% hydrogen, 18.76% chlorine and 8.59% oxygen. The calculated contents of 1-methyl-3-(5-chloro-2-pyridyl)urea include 45.29% carbon, 4.34% hydrogen, 19.1% chlorine and 8.62% oxygen.

EXAMPLE II 16.5 grams (0.075 mole) of 2-amino-5-iodopyridine and 5.4 grams (0.09 mole) of methyl isocyanate were reacted at room temperature in 75 milliliters of acetone containing a catalytic amount of dibutyltin diacetate. After several days, a first portion of solid product was collected from the reaction mixture. After further cooling and concentration of the recation mixture, a second portion of solid product was obtained. The two portions of solid product were combined and digested with boiling heptane to effect a perliminary purification. The product was then separated from the heptane and dried, after which it was found to weight 9.9 grams (48% of theoretical yield) and to have a melting point of 182–184° C. Analytical samples further purified by recrystallization from methanol had a melting point of 182.5–184.5° C. and contained 30.02% carbon, 3.42% hydrogen and 14.60% and 14.62% nitrogen. The calculated contents of 1-methyl-3-(5-iodo-2-pyridyl)urea include 30.34% carbon, 2.19% hydrogen and 15.17% nitrogen.

EXAMPLE III 25 grams (0.2 mole) of 5-amino-2-methoxypyridine and 14.4 grams (0.24 mole) of methyl isocyanate were reacted in benzene containing 2 drops of dibutyltin diacetate. The solid reaction product which was obtained in an amount equal to about 100% of the theoretical yield, had a melting point of 140–141° C. Analytical samples recrystallized from a mixture of acetone and hexane had the same melting point and contained 53.16% and 52.79% carbon, 6.02% and 5.94% hydrogen and 23.35% and 23.37% nitrogen. The calculated contents of 1-methyl-3-(2-methoxy-5-pyridyl)urea include 53.0% carbon, 6.12% hydrogen and 23.19% nitrogen.

EXAMPLE IV 35.6 grams (0.225 mole) of isobutyric anhydride was added dropwise with cooling to 19.3 grams (0.15 mole) of 2-amino-5-chloropyridine. The reaction mixture was permitted to stand at room temperature for one hour and was then heated at steam-bath temperature for one-half hour. Isobutyric acid side product and excess isobutyric anhydride were removed by vacuum distillation and the semi-solid residue was triturated with petroleum ether (B.P. 30–60° C.). The solid product was collected, washed with additional petroleum ether and dried, after which it weighed 25.6 grams (60% of theoretical yield) and had a melting point of 103–105° C. Analytical samples recrystallized from heptane had a melting point of 104.5–105.5° C. and contained 54.46% and 54.31% carbon, 5.55% and 5.58% hydrogen and 14.53% and 14.0% nitrogen. The calculated contents of N-(5-chloro-2-pridyl)-isobutyramide include 54.41% carbon, 5.58% hydrogen and 14.1% nitrogen.

EXAMPLE V 35.6 grams (0.225 mole) of isobutyric anhydride was reacted with 18.6 grams (0.15 mole) of 5-amino-2-methoxypyridine, after which isobutyric acid side product and excess isobutyric anhydride were removed by vacuum distillation. The semi-solid residue was triturated with petroleum ether (B.P. 30–60° C.) and collected. After the crude product was digested with warm (70° C.) heptane, the slurry was chilled. Following separation from the slurry, the solid was washed with petroleum ether and dried. The crude product weighed 25.5 grams (60% of theoretical yield) and had a melting point of 92–93° C. Analytical samples recrystallized from heptane had a melting point of 93.5–94.5° C. and contained 61.60% and 61.86% carbon, 7.18% and 7.36% hydrogen and 14.58% and 14.65% nitrogen. The calculated contents of N-(2-methoxy-5-pyridyl)-isobutyramide include 61.83% carbon, 7.26% hydrogen and 14.43% nitrogen.

The novel compounds of this invention have been found to exhibit considerable fungicidal activity, which is defined for purposes of this specification and the appended claims as a capacity for killing, inhibiting or inactivating a fungus, and thereby for preventing or controlling its growth. The novel compounds have been found to be effective when used in combating plant pathogenic fungi, which cause considerable loss of agricultural and horticultural crops, and particularly when administered systemically to plants susceptible to fungus infestation. In this specification and the claims and as is known to those skilled in the art, a "systemic" substance is intended to mean a substance which is translocated from one part of a plant to another part of the plant when administered to a portion thereof, such as by application to soil in which the plant grows and from which the fungicide is absorbed through the roots of the plant, or by application to the leaves of the plant for absorption into the interiors of the leaves, or by artificial injection, e.g., by a syringe, into the interior of the plant body. After being absorbed by one portion of the plant, a systemic fungicide is carried throughout the plant body, thereby protecting substantially all fo the plant from attack by fungi.

The novel compounds can be used as systemic fungicides in various ways. They may be applied to the plants without prior dilution and as solids or in vaporized form. Preferably, they are used as one of several components of a fungicidal composition which can be applied either to the soil for uptake by plant roots for absorption into the plant body, directly onto the stem or leaves of the plant for subsequent translocation, or directly to the plant seed before it is planted. Such a fungicidal composition can be applied as a dust, a liquid spray or a gas-propelled spray and may contain a carrier, an emulsifying agent, a wetting agent, gases compressed to the liquid state, stabilizers, other fungicidal components, etc.

The novel compounds can be applied in a wide variety of concentrations, with the concentration in each fungicidal composition depending on the purpose for which it is to be used, the application method contemplated, the nature of the condition to be controlled, and other commonly encountered factors. When the composition is applied to the environment around the roots of plants, a concentration adequate to provide as little as 1 part per million or less of the fungicidal compound in the environment adjacent the roots will be effective for some purposes. In general, compositions containing between about 0.05 and about 0.5 percent by weight, in either a liquid or solid carrier, give good results. For some purposes, stronger concentrations up to 10 percent or higher may be desirable. Liquid carriers which may be employed include water, organic solvents, mineral oils, and other solvents and suspension media. To facilitate the dispersion of the novel compounds in water, the composition may also contain a water-miscible solvent, e.g. acetone. Suitable solid carriers include talc, bentonite, gypsum, diatomaceous earth, pyrophyllite, fuller's earth, flours derived from cotton seeds or walnut shells, various natural and synthetic clays and other similar powdered materials.

The following results are representative of the high activity of the compounds of this invention when used, for example, against fungi of types such as Puccinia rubigo-vera which, on infecting wheat plants, cause the condition known as leaf rust.

For purposes of the fungicidal activity tests, Cheyenne wheat seeds were germinated on metal screens in a moist chamber maintained at 70° F. When the seedlings were 4 days old, their roots were submersed in nutrient solutions each containing a small amount of one of the novel compounds produced as described in Examples I to V. Forty-eight hours later, the seedlings were inoculated by dusting the foliage with uredospores of Puccinia rubigo-vera. The inoculated plants were then maintained overnight (12 to 16 hours) in a moist chamber and then returned to the greenhouse. The percentage of control of the fungus was determined 7 days later by comparing the number of infection loci on each plant treated with the novel fungicidal composition and the number of infection loci on untreated plants maintained in the same Run under otherwise substantially identical conditions. A well known fungicide, Griseofulvin, and a pyridyl urea having no ring substituents other than the urea group, 1-methyl-3-(2-pyridyl)urea, were similarly administered to Cheyenne wheat seedlings for comparative activity tests.

The test results demonstrating the activity of the novel compounds of this invention and comparing their activity to that of Griseofulvin and 1-methyl-3-(2-pyridyl)urea are set forth in the following table. In the table, the test concentrations of the novel fungicidal compounds are expressed in parts per million in the nutrient solution in which the plant roots were submersed, phytotoxicity represents injury caused by the chemical treatment, and fungus control represents the percentage in which infection loci are absent from treated plants, based on the number of infection loci on untreated plants.

The number of infection loci per plant which developed on untreated plants maintained under conditions otherwise substantially identical to those of fungicidal activity tests were as follows: Run No. 1—96 infection loci, Run No. 2—82 infection loci, Run No. 4—41 infection loci.

FUNGICIDAL EFFECTIVENESS FOR SYSTEMIC CONTROL OF LEAF RUST IN WHEAT

| Fungicidal compound | Concentration of fungicide, p.p.m. | Fungus control, percent | Phytotoxicity |
|---|---|---|---|
| Run No. 1: | | | |
| 1-methyl-3-(5-chloro-2-pyridyl)urea (Example I). | 1 | 20.7 | None. |
|  | 3.2 | 87.2 | Slight. |
| 1-methyl-3-(2-pyridyl) urea | 3.2 | 0 | None. |
| Griseofulvin | 1 | 0 | None. |
|  | 3.2 | 10.3 | Do. |
| Run No. 2: | | | |
| 1-methyl-3-(5-iodo-2-pyridyl) urea (Example II). | 1 | 0 | Do. |
|  | 3.2 | 77.6 | Do. |
| Griseofulvin | 1 | 0 | Do. |
|  | 3.2 | 14 | Do. |
| Run No. 3: | | | |
| 1-methyl-3-(2-methoxy-5-pyridyl)urea (Example III). | 10 | 100 | None-slight. |
| Run No. 4: | | | |
| N-(5-chloro-2-pyridyl)isobutyramide (Example IV). | 1 | 0 | None. |
|  | 3.2 | 52.1 | Do. |
| N-(2-methoxy-5-pyridyl)isobutyramide (Example V). | 1 | 61.8 | Do. |
|  | 3.2 | 100 | Do. |
| Griseofulvin | 1 | 0 | Do. |
|  | 3.2 | 37.3 | Do. |

From the test results set forth in the foregoing table, it can be seen that the novel pyridyl amides of this invention can highly effective fungicides. Although the present invention has been illustrated with preferred embodiments, it is to be understood that modifications and variations may be employed without departing from the spirit and scope of this invention, as those skilled in the art will readily understand. Such variations and modifications are therefore considered to be within the purview and scope of the appended claims.

We claim:
1. A fungicidal composition comprising a carrier for a fungicide and a nonphytotoxic fungicidally effective amount of a compound having the formula

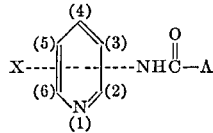

wherein the

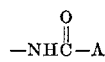

group is attached in one of the 2-, 4-, and 5-positions and wherein —A is selected from the group consisting of —NHR in which R is an alkyl group containing from one to six carbon atoms, and a branched-chain alkyl group containing from three to six carbon atoms; and X is selected from the group consisting of halogen and alkoxy (—OCH$_3$ to —OC$_8$H$_{17}$) and X is attached to a carbon atom in the pyridine ring which is nonadjacent to the position at which the

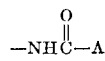

group is attached to the ring.

2. A fungicidal composition, as defined in claim 1, wherein said compound is 1-methyl-3-(5-chloro-2-pyridyl)urea.

3. A fungicidal composition, as defined in claim 1, wherein said compound is 1-methyl-3-(5-iodo-2-pyridyl)urea.

4. A fungicidal composition, as defined in claim 1, wherein said compound is 1-methyl-3-(2-methoxy-5-pyridyl)urea.

5. A fungicidal composition, as defined in claim 1, wherein said compound is N-(2-methoxy-5-pyridyl)isobutyramide.

6. A fungicidal composition, as defined in claim 1, wherein said compound is N-(5-chloro-2-pyridyl)isobutyramide.

7. A method of combatting a fungus, which comprises contacting it with a non-phytotoxic fungicidally effective amount of a compound defined by claim 1.

8. A method of protecting a plant against a pathogenic plant fungus, which comprises applying to the plant a non-phytotoxic fungicidal effective amount of a compound defined by claim 1.

9. A method of combatting a pathogenic plant fungus, which comprises applying a non-phytotoxic fungicidally effective amount of pound defined by claim 1 to the soil in which a plant is to grow.

10. A method, as defined in claim 9, wherein said compound is 1-methyl-3-(5-chloro-2-pyridyl)urea.

11. A method, as defined in claim 9, wherein said compound is 1-methyl-3-(5-iodo-2-pyridyl)urea.

12. A method, as defined in claim 9, wherein said compound is 1-methyl-3-(2-methoxy-5-pyridyl)urea.

13. A method, as defined in claim 3, wherein said compound is N-(2-methoxy-5-pyridyl)isobutyramide.

14. A method, as defined in claim 9, wherein said compound is N-(5-chloro-2-pyridyl)isobutyramide.

References Cited

UNITED STATES PATENTS 3,293,257  12/1966  Woods et al. _____ 260—295
3,376,309   4/1968  Foster et al. _____ 260—295

S. K. ROSE, Primary Examiner

U.S. Cl. X.R.
71—94

UNITED STATES PATENT OFFICE
CERTIFICATE OF CORRECTION

Patent No. 3,467,753      Dated September 16, 1969

Inventor(s) Harold M. Foster and John R. Kilsheimer

It is certified that error appears in the above-identified patent and that said Letters Patent are hereby corrected as shown below:

Column 1, line 48, "$(C_1C_4)$" should be --$(C_1-C_4)$--. Column 2, line 69, "invention" should be followed by a comma. Column 5, line 16, "2.19%" ahould be --2.91%--. Column 5, line 30, "53.0%" should be --53.03%--. Column 8, line 42, "of pound" should be --of a compound--. Column 8, line 50, "as defined in claim 3" should be --as defined in claim 9--.

SIGNED AND SEALED

MAY 19 1970

(SEAL)
Attest:

Edward M. Fletcher, Jr.
Attesting Officer

WILLIAM E. SCHUYLER, JR.
Commissioner of Patents